United States Patent [19]
Rieli

[11] 3,771,615
[45] Nov. 13, 1973

[54] AMPHIBIOUS ALL-TERRAIN VEHICLE

[76] Inventor: Anthony Rieli, 704 Washington Rd., Grosse Pointe, Mich. 48230

[22] Filed: Aug. 6, 1971

[21] Appl. No.: 169,760

[52] U.S. Cl............... 180/6.48, 115/1 R, 180/77 H, 180/89 R
[51] Int. Cl............................................ B62d 11/04
[58] Field of Search................ 180/6.2, 6.48, 24.04, 180/24.06, 89, 77 H; 115/1 R

[56] References Cited
UNITED STATES PATENTS

| | | | |
|---|---|---|---|
| 3,435,798 | 4/1969 | Rieli.................................. | 115/1 R |
| 3,385,255 | 5/1968 | Raymond et al.................... | 115/1 R |
| 3,168,927 | 2/1965 | Garner............................... | 180/6.48 |
| 3,180,305 | 4/1965 | Gower-Rempel.................... | 115/1 R |
| 3,611,827 | 10/1971 | Bottum et al..................... | 180/6.48 X |
| 1,446,121 | 2/1923 | Johnston et al..................... | 180/6.2 |
| 2,800,188 | 7/1957 | Garrett.............................. | 180/6.2 |
| 3,279,637 | 10/1966 | Olson et al......................... | 180/6.48 |
| 3,367,436 | 2/1968 | Fox.................................. | 180/6.48 X |

Primary Examiner—Kenneth H. Betts
Assistant Examiner—Leslie J. Paperner
Attorney—Irving M. Weiner

[57] ABSTRACT

An amphibious all-terrain vehicle which is capable of translating over and through essentially all forms of terrain and substantially any environment. The vehicle has a prime mover operatively associated with at least two hydrostatic transmissions which are mounted in a manner to isolate them from forces exerted on the vehicle. The transmissions supply the power generated by the prime mover through a chain drive system, which multiplies the torque produced by the engine, to a plurality of traction members mounted on both sides of the vehicle. A lubricant is contained in a portion of the vehicle chassis structure to lubricate the chain drive system as it passes therethrough. An automatic chain tensioning device is positioned adjacent each chain of the chain drive system to prevent the chains from operatively disengaging from their mating components due to excessive chain slack during normal straight ahead operation or in the event of a sudden change in the direction of the driving forces being applied to the chain drive system by the transmissions. The vehicle operator steers, controls the forward and reverse directions, and speed of the vehicle by manipulating a single vehicle operators control member.

11 Claims, 22 Drawing Figures

INVENTOR
ANTHONY RIELI
BY Irving M. Weiner
ATTORNEY

INVENTOR
ANTHONY RIELI
BY *Irving M. Weiner*
ATTORNEY

INVENTOR
ANTHONY RIELI
BY Irving M. Weiner
ATTORNEY

AMPHIBIOUS ALL-TERRAIN VEHICLE

BACKGROUND OF THE INVENTION

1. Field of the Invention

The invention relates to a vehicle which is capable of carring passengers and/or cargo over and through substantially all types of terrain and any environment. In particular, the invention pertains to an amphibious all-terrain vehicle including a novel engine and transmission mounting means, drive system, and vehicle operators control means which renders the vehicle more reliable and easier to operate. Although these features are described with reference to an amphibious all-terrain vehicle, they may be incorporated with a multitude of machines, or limited-terrain vehicles.

2. Description of Prior Art

The prior art amphibious all-terrain vehicles experience a number of drive system problems such as short chain drive system life due to a lack of lubrication, drive chains disengaging from their mating drive system components upon a sudden change in direction of the driving forces applied to the drive system by the transmissions, inadequate driving torque due to low, or no multiplication of the engine torque as it is transmitted to the drive system from the transmissions, and failure of the engine and transmissions due to rigidly mounting them to the vehicle, thus subjecting them to the forces exerted on the vehicle as it translates over undulating terrain. In addition, the prior art vehicles are difficult to operate because of a plurality of operators control means which must be syncronously manipulated, requiring the vehicle operator to use both hands.

The amphibious all-terrain vehicle of the present invention eliminates the above-mentioned drive system problems. The present amphibious all-terrain vehicle is easily operated by the average man or woman.

SUMMARY OF THE INVENTION

The invention provides an amphibious all-terrain vehicle having chassis and a body, with at least one passenger compartment, extending substantially the entire width and length of the chassis and affixed thereto. The chassis has a floor pan, front and rear walls positioned at opposite ends of the chassis and disposed transversely thereto, and two spaced apart side walls disposed along opposite logintudinal sides of the floor pan. Two chassis side rails are located interior to the chassis disposed along opposite longitudinal sides, and extend substantially the entire length of the chassis. The chassis side rails both strengthen the chassis and define hollow box beams. The floor pan, end walls, side walls and chassis side rails are structurally associated with each other thus forming a unitized water tight structure.

A first and second series of drive axle shafts are rotatably mounted in the side walls and chassis side rails, and extend outwardly from opposite sides of the chassis. A plurality of traction members, such as wheels or tracks, are operatively associated with these first and second series of drive axle shafts to support the vehicle on, and to enable it to translate relative to a surface.

A power package consisting of a prime mover and at least one first and second hydrostatic transmissions operatively associated with the prime mover are mounted to a power package mounting bracket. This bracket is in turn mounted in the chassis between the front and rear walls. Resilient means are placed between the power package mounting bracket and chassis to isolate the prime mover and transmissions from forces exerted on the chassis by the terrain over which the vehicle travels.

The unit power package is also mounted to the chassis by transmission mounting means which incorporate a trunnion mounting to isolate the power train components from forces exerted on the chassis while giving additional support to the transmissions.

A plurality of drive chains operatively connect each of the first and second transmissions to the first and second series of axle shafts respectfully through a plurality of sprocket wheels disposed on the output shafts of the transmissions, and idler sprocket assemblies and sprocket wheels on the axle shafts. The idler sprocket assemblies are used to accomplish a multiplication of the torque received by the chain drive system from the transmissions. A portion of the chain drive system is routed through the box beams formed by the chassis side rails and are therein lubricated by a lubricant housed in the box beams.

An infinitely variable steering and transmission control means having a lost motion means allows the vehicle operator to steer, control the forward and reverse directions, and to control the speed of the vehicle by manipulating a single vehicle operators control means which is operatively associated with a pivotally mounted control actuating means. The lost motion means includes at least two spring loaded control levers each pivotally mounted at one end to the control actuating means. Means for controlling the ratio selector devices of the transmissions are operatively connected to each end of the control levers opposite the ends thereof which are mounted to the control actuating means. Under particular predetermined conditions the control actuating means can be actuated to move about its pivot mounting without imparting a motion to the control levers, the forces applied to the control levers by the actuating means being used to compress the spring of one of the spring loaded control levers instead of displacing the control lever in a manner to exert a force on the transmission ratio selector device control means.

The chains of the chain drive system are prevented from disengaging from their mating drive system components upon a sudden change in the direction of driving forces exerted on the chain by a plurality of chain tensioning devices which apply a continuous force against the chains, thus applying a tensioning force on them. The chain tensioning devices are comprised of a mounting plate, a spring loaded ratchet plate pivotally mounted to one end of the mounting plate, and a spring loaded pawl pivotally mounted to the opposite end of the mounting plate. Ratchet teeth are located at the end of the ratchet plate opposite its pivoted end. These ratchet teeth are adapted to engage the pawl. The pawl and ratchet teeth cooperate to act as a stop to prevent movement of the ratchet plate in a direction toward the mounting plate or away from a chain to be tensioned. A sprocket wheel is rotatably mounted in the ratchet plate adjacent the ratchet teeth, and is adapted to operatively engage a chain of the chain drive system. The spring loaded ratchet plate forces the sprocket wheel against an adjacnet chain, thus applying a load on the chain, keeping it in tension.

DESCRIPTION OF THE INVENTION

Figure 1:
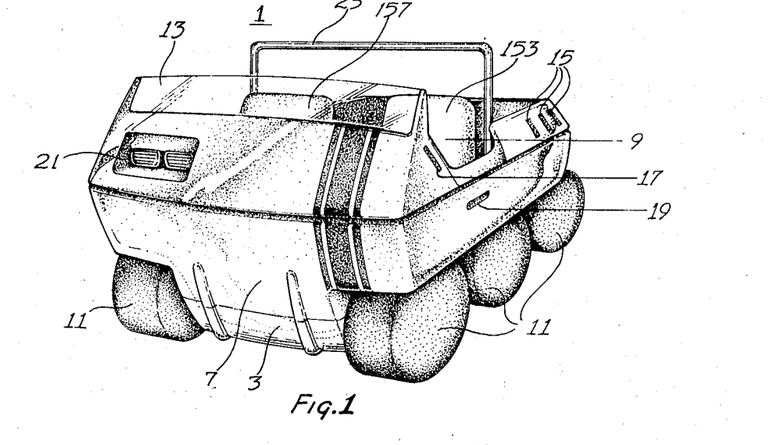
FIG. 1 is a prospective view of the amphibious all-terrain vehicle including the body and passenger compartment.
Figure 2:
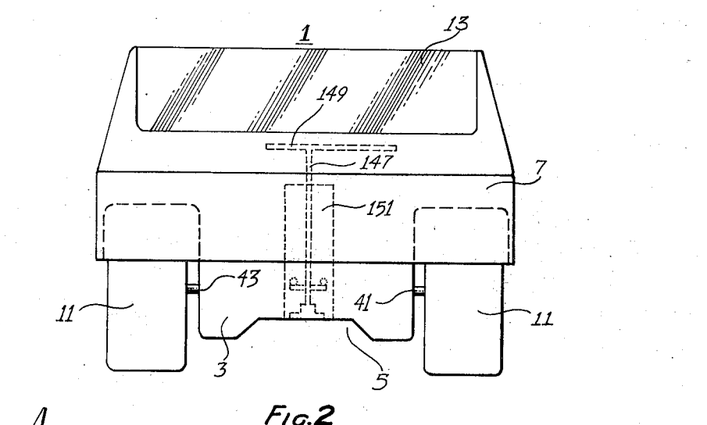
FIG. 2 is a front view of the vehicle shown in FIG. 1.
Figure 3:
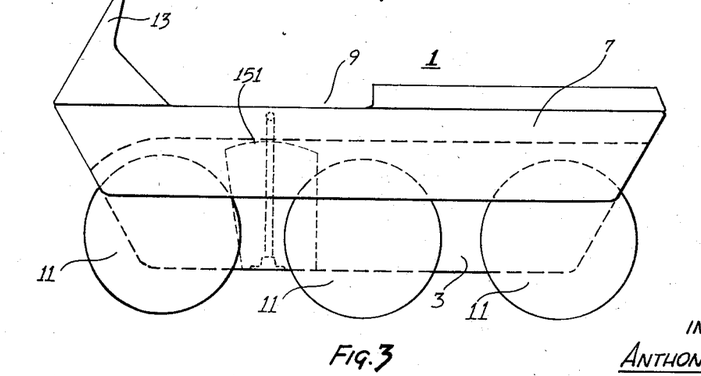
FIG. 3 is a side view of the vehicle shown in FIG. 1.

With reference to FIGS. 1, 2 and 3, the amphibious all-terrain vehicle, generally denoted as 1, includes a chassis 3 having a generally concave recess 5, a body 7, having at least one passenger compartment 9, extending substantially the entire length and width of the chassis and affixed thereto, and a plurality of traction members 11 disposed on opposite sides of the vehicle.

The body may have a windshield 13, and openings 15 in the sides which act as cooling air exhaust ducts to exhaust air from a prime mover positioned interior to the body to cool it. Notches 17, 19 may be placed in the body to act as a hand grab, and foot step respectively to aid vehicle passengers in entering and exiting. A headlamp 21 may be situated in the body for night driving. For added protection a roll bar 23 can be used.

Figure 6:
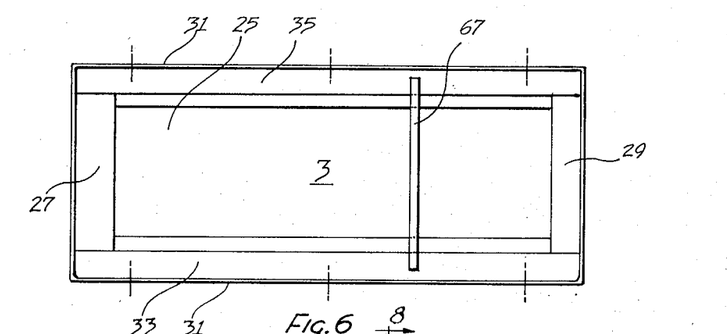
FIG. 6 is a top view of the chassis of the vehicle shown in FIGS. 1, 2 and 3.
Figures 7, 8, 9:
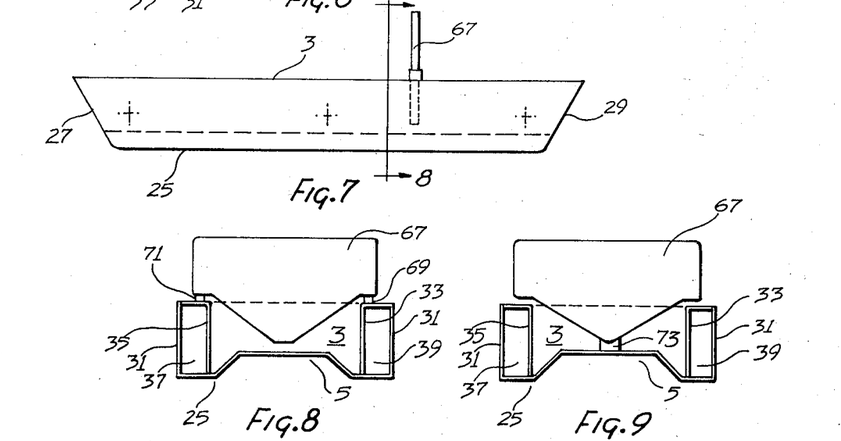
FIG. 7 is a side view of the chassis shown in FIG. 6.
FIG. 8 is a front sectional view of the chassis taken along line 8—8 of FIG. 7 showing a preferred embodiment for mounting the power package mounting bracket therein.
FIG. 9 is a front sectional view of the chassis also taken along line 8—8 of FIG. 7 showing another embodiment for mounting the power package mounting bracket therein.

As best shown in FIGS. 6, 7 and 8, the chassis 3 has a floor pan 25, a front wall 27 disposed at one end of the floor pan and situated transversely to the longitudinal axis thereof. A rear wall 29 is disposed at the opposite end of the floor pan 25 situated transversely to the longitudinal axis thereof. Two spaced apart side walls 31 are located along opposite longitudinal sides of the floor pan 25. At least two spaced apart chassis side rails 33, 35 are located interior to the chassis 3 disposed along opposite longitudinal sides, and extending substantially the entire length of the chassis 3.

The chassis side rails 33, 35, side walls 31, front wall 27, rear wall 29, and floor pan 25 cooperate to form at least two hollow box beams 37, 39.

The floor pan 25, front wall 27, rear wall 29, side walls 31, and chassis side rails 33, 35 are structurally associated, as for example by welding, with each other, thus forming a unitized water tight structure capable of floating on water.

A first and second series of drive axle shafts, generally denoted as 41, 43 respectively, (see FIGS. 2, 14, 15 and 16) extend outwardly from opposite chassis side walls 31. The axle shafts are individually rotatably mounted, in first bearings 45, (See FIGS. 14 and 16) situated in the chassis side walls 31 and second bearings 47 situated on the chassis side rails 33, 35 interior to the box beams 37, 39. Seals 49 are associated with each axle shaft of the first and second series of axle shafts 41, 43 to prevent the ingress of contaminates into the bearings 45, and in the hollow box beams 37, 39 and egress of lubricating oil therefrom.

A plurality of traction members 11 (see FIGS. 1, 2, 3, and 16) are operatively associated with the first and second series of axle shafts 41, 43 to supply a resisting force to a surface on which the vehicle rests, thus enabling the vehicle to translate relative to this surface. The traction members 11 shown in the Figures are wheels, however the use of endless tracks is well within the confines of the present invention.

Figure 4:
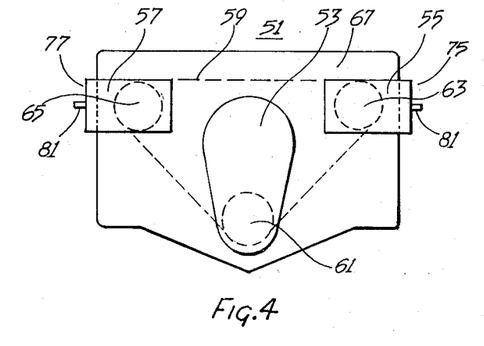
FIG. 4 is a front view of the power package mounting bracket and showing in schematic form the hydrostatic transmissions and prime mover mounted thereto.
Figure 5:
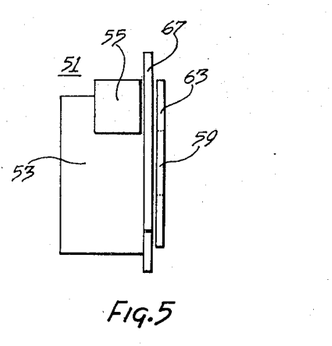
FIG. 5 is a side view of the power package mounting bracket shown in FIG. 4.

A power package generally denoted as 51 (see FIGS. 4 and 5) includes at least one prime mover 53, for example a two-cycle, four cycle or Wankel engine, and at least a first and second hydrostatic transmission 55, 57 operatively associated with the prime mover by an endless belt 59 interconnecting a driving pulley 61 of the prime mover, 53, and driven pulleys 63, 65 associated with the first and second hydrostatic transmissions respectively.

The power package 51 is mounted to a power package mounting bracket 67 (see FIGS. 4–9). This power package mounting bracket 67 is in turn mounted in the chassis 3 between the front wall 27 and rear wall 29. Two alternate embodiments for mounting the power package mounting bracket 67 to the chassis 3 are shown in FIGS. 8 and 9. Other possible methods of mounting will be obvious to persons skilled in the art upon reading this specification, and are within the scope of the present invention. The preferred embodiment, shown in FIG. 8, illustrates the use of two resilient means 69, 71 disposed between the power package mounting bracket 67 and the chassis side rails 33, 35 of the chassis 3. An alternate embodiment, shown in FIG. 9 utilizes one resilient means 73 situated between the power package mounting bracket 67 and the floor pan 25 of the chassis 3. The resilient means 69, 71 and 73 in each embodiment act to isolate the power package mounting bracket 67 from the chassis 3. The effect is to prevent the vibrations produced in the chassis by any undulating terrain over which the vehicle travels from being transmitted to the prime mover 53 and hydrostatic transmissions 55, 57, and also to prevent prime mover vibrations from being transmitted to the chassis.

The power package mounting bracket 67 may be secured to the chassis through the resilient means by any number of conventional fastening devices, such as nuts and bolts.

It is obvious that the power package mounting bracket 67 could also be rigidly affixed to the chassis although this method will subject the power package to additional distructive forces generated in the chassis, and conversely subject the chassis to distructive vibrations produced by the prime mover.

Figure 10:
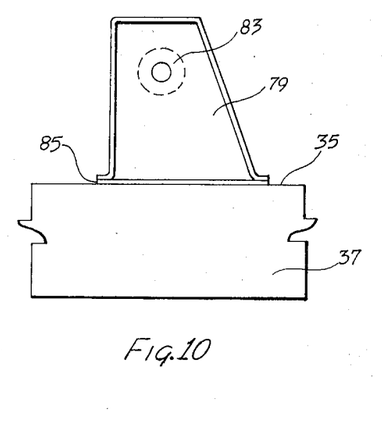
FIG. 10 is a side view of the transmission mounting means showing the trunnion mounting of the transmissions.
Figure 11:
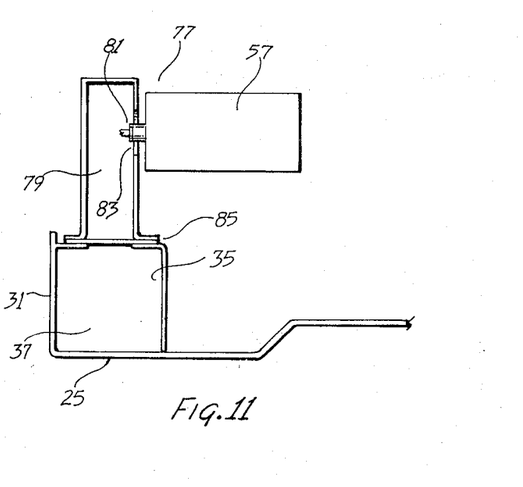
FIG. 11 is a front view of the transmission mounting means shown in FIG. 10.

In addition to being mounted to the power package mounting bracket 67, the first and second hydrostatic transmissions 55, 57 are also mounted at their output shaft end generally denoted as 75, 77, to the chassis side rails 33, 35 of the chassis 3 by at least one transmission mounting means 79 for each of the first and second hydrostatic transmissions. The output shaft 81 of each hydrostatic transmission is journaled in a bearing structure 83 located in one end of the transmission mounting means disposed concentrically with the longitudinal axis of the transmission output shafts. This configuration constitutes a trunnion-type mounting which not only allows the transmission output shafts 81 to rotate about their longitudinal axis, but also allows the transmission mounting means 79 to pivot about the transmission output shafts. This effectively prevents any distortions of the chassis 3 produced by undulating terrain from reaching the transmissions 55, 57 through the transmission mounting means 79, the distortion being dissipated in a pivoting motion of the transmission mounting means 79 about the trunnion-type mounting configuration. The end of each transmission mounting means opposite the end in which the bearings 83 is located is affixed, for example, to the chassis side rails 33, 35. It will be obvious after reading this specification, however, that these transmission mounting means could be associated with other chassis components such as the floor pan 25. Preferrably a resilient means 85 is located between the transmission mounting means 79 and the chassis side rails 33, 35 to further isolate the chassis from the hydrostatic transmissions 55, 57, thus, preventing vibrations in the chassis from reaching the transmissions and vibrations in the power package from reaching the chassis.

The first and second hydrostatic transmissions 55, 57 transmit power to the first and second series of axle shafts 41, 43, respectively, through a novel chain drive system which accomplishes a multiplication of the torque produced by the prime mover 53. The components of the chain drive system (see FIGS. 14, 15 and 16) associated with the first and second series of axle shafts 41, 43 are identical and are referred to by the same reference numerals. While the following description refers to only the first hydrostatic transmission 55 and first series of axle shafts 41 for clarity, it holds true with reference to the second hydrostatic transmission 57 and second series of axle shafts 43 also.

Figure 14:
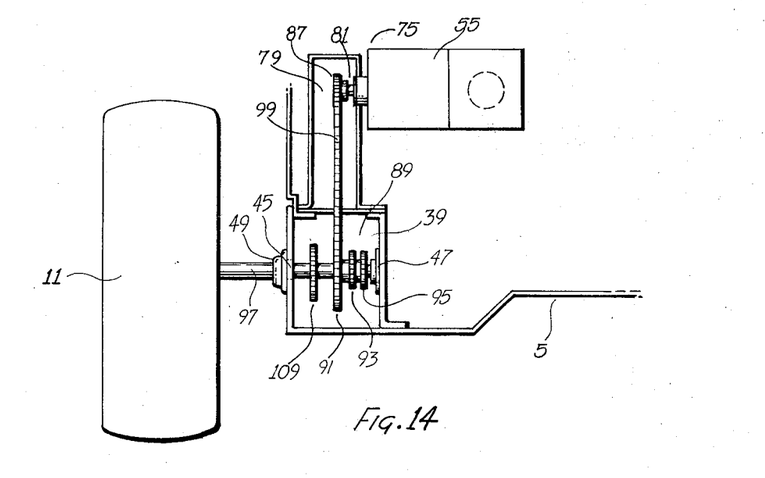
FIG. 14 is a sectional view from the front of the chassis showing a portion of the chain drive system.
Figure 15:
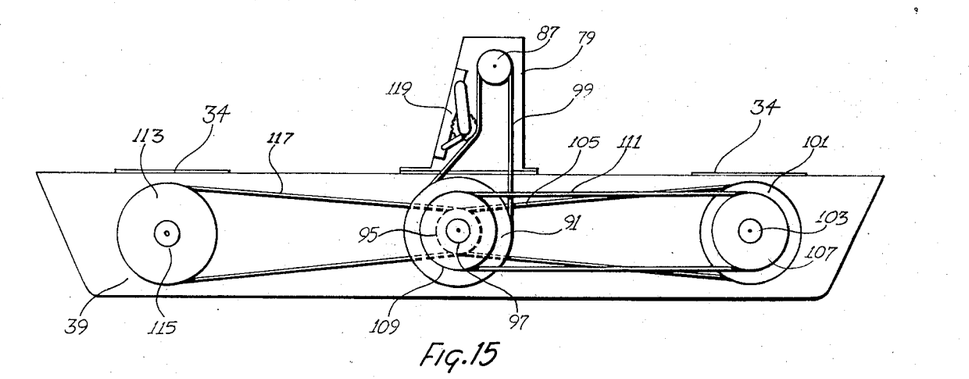
FIG. 15 is a view from the side of the chassis showing a portion of the chain drive system.
Figure 16:
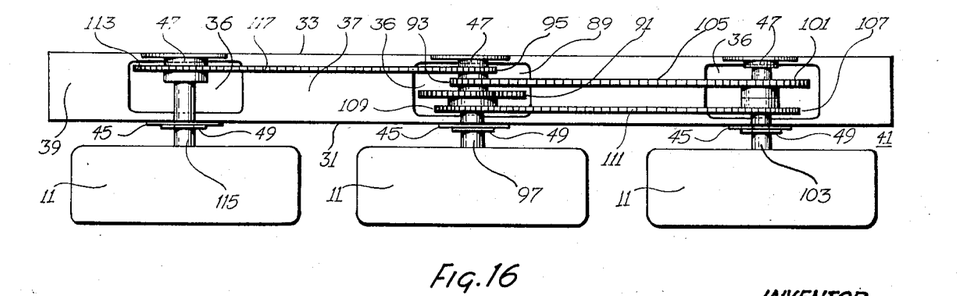
FIG. 16 is a view from the top of the chassis showing a portion of the chain drive system.

At least one first chain driving sprocket wheel 87 is affixed to the output shaft 81 of the first hydrostatic transmission 55 to rotate therewith. At least one idler sprocket assembly 89 having at least a first 91, second 93, and third 95 chain sprocket wheels is rotatably mounted on a first axle shaft 97. At least one first driving chain 99 operatively interconnects the first chain driving sprocket wheel 87 to the first chain sprocket wheel 91 of the idler sprocket assembly 89 to transmit power and rotational motion from the transmission to the idler sprocket assembly. Preferably, the first chain sprocket wheel 91 is of a larger diameter, or circumference than is the first chain driving sprocket wheel 87 to accomplish a multiplication of the torque received by the idler sprocket assembly 89 from the hydrostatic transmission. At least one second chain driven sprocket wheel 101 is operatively affixed to a second axle shaft 103, and at least one second driving chain 105 operatively interconnects the second chain sprocket wheel 93 of the idler sprocket assembly 89 to this second chain driven sprocket wheel 101 to transmit power and rotational motion from the idler sprocket assembly to the second chain driven sprocket wheel 101, and hence to the second axle shaft 103. Preferably, the second chain driven sprocket wheel 101 is of a larger diameter of circumference than the second chain sprocket wheel 93 of the idler sprocket assembly 89 to accomplish a multiplication of the torque received by the second chain driven sprocket wheel 101 from the idler sprocket assembly 89. Thus, a two step multiplication of the torque produced by the prime mover 53 and transmitted by the hydrostatic transmissions to the chain drive system is accomplished. At least one third chain driven sprocket wheel 107 is also operatively affixed to the second axle shaft 103 to rotate therewith, and a fourth chain driven sprocket wheel 109 is operatively affixed to the first axle shaft 97. At least one third driving chain 111 operatively interconnects the third chain driven sprocket wheel 107 to the fourth chain driven sprocket wheel 109 to transmit the multiplied torque and rotational motion received by the second chain driven sprocket wheel 101 and second axle shaft 103 to the fourth chain driven sprocket wheel 109, and hence to the first axle shaft 97. Preferably the fourth chain driven sprocket wheel 109 is of the same diameter, or circumference as the third chain driven sprocket wheel 107 so that the first axle shaft 97 receives the same amount of torque at the same r.p.m. as the second axle shaft 103. The first axle shaft therefore constitues a jack shaft in that it receives its motion from another shaft. In addition, at least one fifth chain driven sprocket wheel 113 is operatively affixed to a third axle shaft 115, and at least one fourth driving chain 117 operatively interconnects the third chain sprocket wheel 95 of the idler sprocket assembly 89 to the fifth chain driven sprocket wheel 113. Preferably the third chain driven sprocket wheel 95 is the same diameter of circumference as the second chain sprocket wheel 93, and the fifth chain driven sprocket wheel 113 is the same diameter, or circumference as the second chain driven sprocket wheel 101 so that the third axle shaft 115 receives the same amount of torque at the same r.p.m. as does the first and second axle shafts 97, 103.

In the embodiment of the present invention shown in the accompanying figures, a portion of the chain drive system is enclosed in the hollow box beams 37, 39 (see FIGS. 14-16) interior to the chassis 3. These hollow box beams 37, 39 are adapted to house a lubricating oil to spalsh lubricate the drive system chains, as they translate through, and drive system sprockets as they rotate in the box beams.

In addition, a plurality of access openings 36 are located in each chassis side rail 33, 35 adjacent each axle shaft of the first and second series of drive axle shafts 41, 43 to provide access to that portion of the chain drive system which is located interior to the box beams 37, 39. Removeable sealable cover plates 34 are adapted to close and seal the openings 36 to prevent the ingerss of contaminates into, and egress of oil from the box beams 37, 39.

It is readily seen from the above description of the chain drive system that the power delivered to each of the driven axles of the first series of axle shafts is equal. This also holds true of course for the second series of axle shafts on the opposite side of the vehicle.

Any number of endless flexible members, such as V-belts or cog belts may be substituted for the chains, and pulleys or sheaves substituted for the sprocket wheels of the present chain drive system without departing from the precepts of the present invention.

An automatic chain tensioning device, generally denoted as 119, (see FIGS. 12 and 13) is operatively associated with the chains of the chain drive system to prevent a chain from disengaging from its associated sprocket wheels by maintaining proper chain tensioning during normal straight ahead operation and/or upon a sudden reversal in the driection of the forces being transmitted by the chain as happens when, for example, the hydrostatic transmissions ratios are changed from a forward direction ratio to a rearward, or reverse direction ratio. Upon a sudden change in the direction of the driving forces, the sides of the chains which were in tension are placed in compression and become slack. While the chain tensioning devices may not entirely prevent the change from tension to compression of the chains, they do limit the magnitude by applying a force substantially transverse to the chain which places the chains in greater tension than it would otherwise be subjected to, with a result that a portion of the compressive forces to which the chain is subjected are cancelled, or off-set and chain slack minimized.

Figure 12:
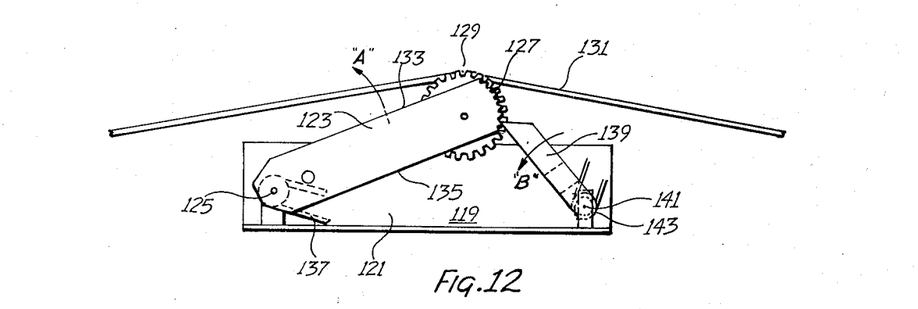
FIG. 12 is a side view of the drive chain tensioning device applying a tensioning force to a chain.
Figure 13:
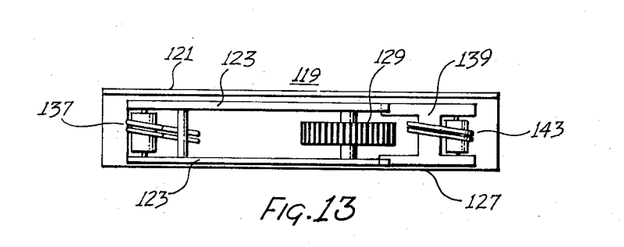
FIG. 13 is a top-view of the drive chain tensioning device shown in FIG. 12.

With reference to FIGS. 12 and 13, the automatic tensioning device 119 includes a mounting plate 121 which is adapted to be secured to a structure, for example, to the transmission mounting means 79, or chassis side rails 33, 35. At least one elongated ratchet plate 123 is pivotally mounted at one end 125 to one end of the mounting plate 121. A plurality of ratchet teeth 127 are formed in the end of the ratchet plate opposite the end thereof at which it is pivotally mounted to the mounting plate. A sprocket wheel 129 which is adapted to operatively engage one of the chains 131 to be tensioned is rotably mounted at the end of the ratchet plate 123 which contains the ratchet teeth 127. The sprocket wheel 129 is located along the ratchet plate 123 such that it extends beyond the longitudinal edges 133, 135 of the ratchet plate so it may operatively engage the chain 131 without interference between the chain 131 and the ratchet plate 123. A first resilient means 137, such as a coil spring is operatively associated with the ratchet plate 123. This resilient means is biased to urge the ratchet plate to pivot about its pivot mounting 125 in a direction generally toward the chain 131 to be tensioned, i.e. in a direction indicated by the arrow "A" shown in FIG. 13. The sprocket wheel 129 thereby contacts the chain 131 and applies a constant force against the chain in a direction substantially transverse thereto, hence subjecting the chain to tensioning forces. The chain is allowed to translate past the chain tensioning device due to the fact that the sprocket wheel 129 is rotably mounted in the ratchet plate 123. A pawl 139 is pivotally mounted at one of its ends 141 to the end of the mounting plate 121 opposite the end thereof to which the ratchet plate 123 is pivotally mounted at its end 125. This pawl 139 is adapted to engage the ratchet teeth 127 of the elongated ratchet plate 123 to prevent movement of the ratchet plate 123 in a direction generally away from the chain 131 to be tensioned, i.e. in a direction opposite that indicated by the arrow "A" shown in FIG. 12. Such a movement would be cuased by the tensioning forces exerted on the chain 131 by the driving forces supplied by the prime mover 53 to the various sprocket wheels of the drive system. A movement of the ratchet plate 123 away from the chain 131 would result in a decrease in the tensioning forces exerted on the chain by the chain tensioning device, and result in excessive chain slack. A second resilient means 143 is operatively associated with the pawl 139, and is biased to urge the pawl 139 generally toward the ratchet teeth 127, i.e. in a direction indicated by the arrow "B" shown in FIG. 12, and into engagement with the ratchet teeth 127 of the ratchet plate 123.

It will be obvious to those skilled in the art upon reading this specification that if endless flexible members, such as V-belts, or cog belts were substituted for the sprocket wheels of the chain drive system, that a pulley or sheave would replace the sprocket wheel 129 in the tensioning device 119 without departing from the precept of the claimed invention.

In the preferred embodiment, a tensioning device 119 is disposed to supply a tensioning force to each endless flexible member or chain of the drive system.

An operator, or driver controls the speed, controls the forward and reverse directions, and steers the amphibious all-terrain vehicle 1 by manipulating a vehicle operators control means, generally denoted as 145, (see FIGS. 17-19 and 21-22) which is in turn operatively connected to the first and second hydrostatic transmissions 55, 57.

Figures 17, 18, 19, 20:
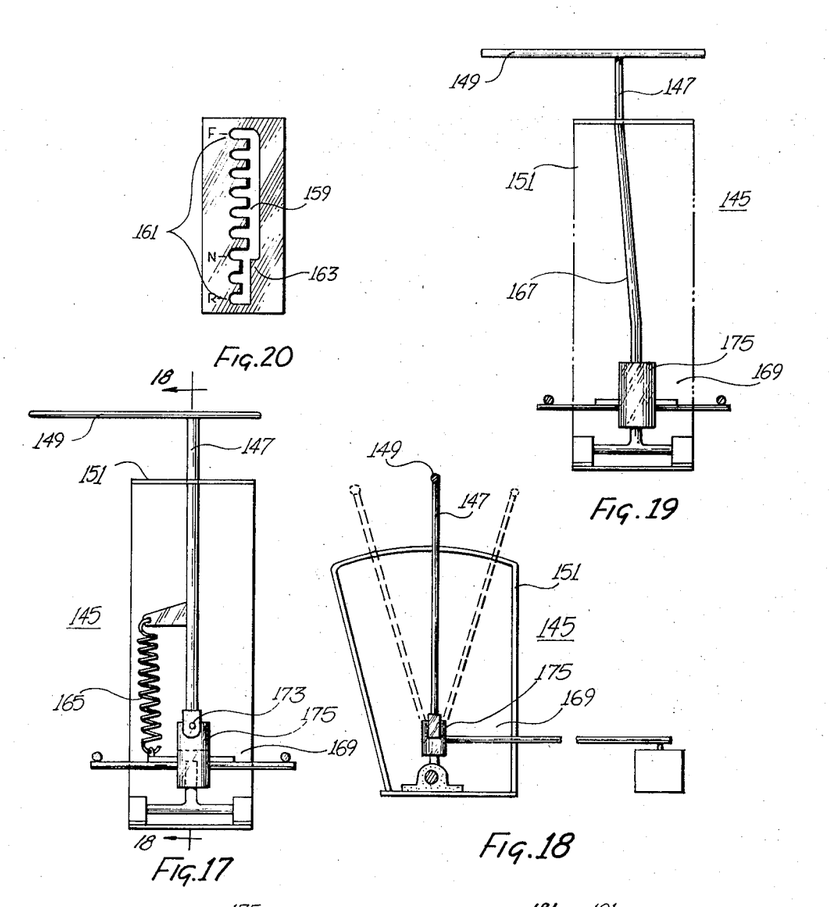
FIG. 17 is a vertical sectional view of the vehicle operators control shaft console showing the preferred embodiment of the vehicle operators control shaft, the vehicle operators control means, acutating means, and lost motion means.
FIG. 18 is a side sectional view of the vehicle operators control shaft console taken along the line 18—18 of FIG. 17.
FIG. 19 is a vertical sectional view of an alternate embodiment of the vehicle operators control shaft.
FIG. 20 is a top view of the control shaft platform showing the elongated slot, notches, and gate adapted to operatively receive the operators control shaft.

As best shown in FIGS. 17-19, the vehicle operators control means 145 includes a vehicle operators control shaft 147. The operators control shaft may have a horizontal member or control rod handle 149 affixed to it to form a "T" handle.

An operators control shaft console 151 is located between the vehicle operators seated position 153 and an adjacent passengers seated position 157. The console 151 has an elongated slot 159 which is situated substantially parallel to the longitudinal direction of the chassis 3 and is adapted to slideably receive the vehicle operators control shaft 147. A plurality of spaced apart notches 161 are disposed along one edge of the elongated slot 159. Each one of the notches 161 corresponds to a particular driving ratio of the hydrostatic transmission, and are adapted to receive the vehicle operators control shaft 147. In addition, a gate 163 is located between a series of notches which correspond to forward motion transmission ratios and rearward motion transmission ratios to prevent the vehicle operator from inadvertently placing the operators control shaft 147 in an undesired series of notches.

In the preferred embodiment shown in FIG. 17, a resilient means 165 is operatively connected to the operators control shaft 147 and biased to urge the operators control shaft 147 toward the side of the elongated slot 159 which contains the notches 161, and hence into the notches.

In a second embodiment shown in FIG. 19, the operators control shaft 167 is positioned such that in its neutral unloaded state it rests in one of the plurality of notches 161 situated along one edge of the elongated slot 159, and has a sufficient modulus of elasticity to resist, to a degree, a force applied to it which would tend to disengage it from one of the notches 161, thus the operators control shaft 167 itself acts as a resilient means.

The infinitely variable steering and transmission control means, generally denoted as 169, includes a control actuating means or joint 175 (see FIGS. 17–19 & 21–22) which is pivotally mounted to the chassis 3 for motion in two planes generally perpendicular to each other, one plane being substantially parallel to a vertical plane along a longitudinal axis of the vehicle, and the other plane substantially parallel to a horizontal plane through the longitudinal axis of the vehicle.

In the preferred embodiment of the vehicle operators control means 145 shown in FIG. 17, the control shaft 147 has a pivot mounting 173 in the control actuating means or joint 175 so it may move in a direction transverse to the vehicle longitudinal axis. Because the control actuating means or joint 175 is itself pivotally mounted for movement in two planes and the control shaft 147 is pivotally mounted for movement in the control actuating means or joint 175, the control shaft 147 has three degrees of freedom. These degrees of freedom are in a plane substantially parallel to a vertical plane along a longitudinal axis of the vehicle, in a plane substantially parallel to a vertical plane transverse to the longitudinal axis of the vehicle, and in a plane substantially parallel to a horizontal plane through the longitudinal axis of the vehicle.

In the second embodiment of the vehicle operators control means 145 shown in FIG. 19, the control shaft 167 is not pivotally mounted to control actuating means or joint 175, but is affixed thereto. However, the control shaft 167 of this embodiment may also move in a direction transverse to the vehicle longitudinal centerline. This movement is accomplished by applying a bending force to the operators control shaft 167. The degree to which the control shaft 167 can be bent is limited by the width of the slot 159 through which the control shaft 167 extends, and which is less than a displacement which would exceed the modulus of elasticity of the material from which the control shaft 167 is fabricated, thus preventing it from taking a permanent "set."

In addition to the control actuating means or joint 175, the infinitely variable steering and transmission control means 169 includes a lost motion means, generally denoted as 171, and means 174, 176 for controlling the ratio selector devices 177, 179 which are part of the hydrostatic transmissions 55, 57, respectively.

Figure 21:
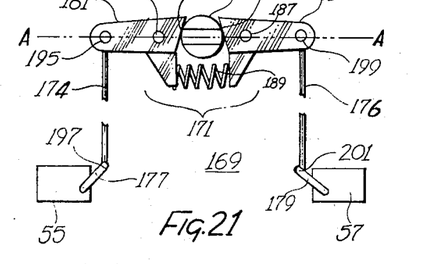
FIG. 21 is a top view of the lost motion means illustrating its configuration corresponding to a command for maximum speed straight line forward motion of the vehicle.
Figure 22:
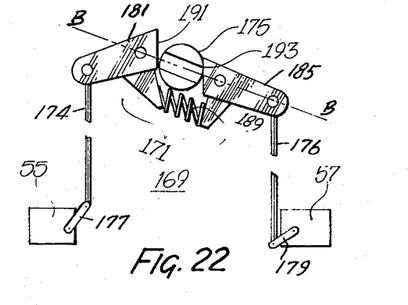
FIG. 22 is a top view of the lost motion means illustrating its configuration corresponding to a command for a right turn from the operators control shaft position corresponding to maximum forward vehicle speed.

As is best shown in FIG. 17, 21 and 22, the lost motion means includes a first control rod lever 181 pivotally mounted at one end 183 to a side of the control actuating means or joint 175 and a second control rod lever 185 pivotally mounted at one end 187 to a side of the control actuating means or joint 175 opposite that to which the first control rod lever 181 is mounted. A resilient means 189 connected to both the first and second control rod levers 181, 185 is biased to produce a force which tends to resist movement of the first control rod lever 181 in a counter-clockwise direction and the second control rod lever 185 in a clockwise direction as viewed in FIG. 21 and 22.

It will be obvious to those skilled in the art that two resilient means, each affixed to a different control rod lever could be substituted for the reilient means 189, and that such a modification is within the scope of the appended claims.

Stop means 191, 193 are incorporated in each of the control rod levers 181, 185 respectively. In the preferred embodiment, best illustrated in FIGS. 21 and 22, these stop means 191, 193 are angled edges formed in each of control rod levers 181, 185. These angles edges contact the peripheral surface of the control actuating means or joint 175 as the first control rod lever 181 is rotated in a clockwise direction and the second control rod lever 185 is rotated in a counter clockwise direction as viewed in FIG. 21 and 22 forward of the line A—A of FIGS. 21 and line B—B of FIG. 22.

Referring to FIGS. 17–19 and 21–22, the ratio selector control means or first control rod 174 is pivotally mounted at one of its ends 195 to an end of the first control rod lever 181 and pivotally mounted at its opposite end 197 to the ratio selector device 177 of the first hydrostatic transmission 55, and the ratio selector control means or second control rod 176 is pivotally mounted at one of its ends 199 to an end of the second control rod lever 185, and pivotally mounted at its opposite end 201 to the ratio selector device 179 of the second hydrostatic transmission 57.

A separate prime mover throttle control, not shown as almost any variety known to the art may be used, is provided to allow the vehicle operator to vary the power out-put of the prime mover.

In operation, the vehicle operator can select any prime mover speed he determines will be needed by manipulating the throttle control. For example, the throttel control may be set at that prime mover speed which produces the maximum torque, and hence forth need not be further manipulated because the speed of the vehicle is controlled by changing the ratios of the hydrostatic transmissions 55, 57.

To select forward transmission ratios the vehicle operator grasps the control handle 149 and moves the vehicle control shaft 147 forward, toward the front of the vehicle through the plane parallel to the vertical plane along the longitudinal axis of the vehicle until the desired forward speed is obtained. The vehicle operator may then release the control handle 149 and the resilient means 165 connected to the control shaft 147 will urge the control shaft 147 into one of the notches 161 located along the slot 159 in the control shaft console 151. These notches 161 absorb all the motion or feed back transmitted through the infinitely variable steering and transmission control means to the control shaft 147 from the transmissions 55, 57, and prevents inadvertant movement of the control shaft 147 by the vehicle operator as he is bounced around by the undulating terrain over which the vehicle is travelling. By restricting any undeisred motion of the control shaft 147, the transmissions 55, 57 are maintained in speed ratios consistent with the operating conditions required at that moment.

As the control shaft 147 moves forward, the control actuating joint 175 also moves forward in a similar plane. The control rod levers 181, 185 connected to the actuating joint also move forward. The resilient means 189 prevents the control rod levers 181, 185 from pivoting about their respective pivot mountings 183, 187 in directions generally toward each other, thus the control rod levers 181, 185 pull the control rods 174, 176 forward. The control rods 174, 176 in turn pull the hydrostatic transmission ratio selector devices 177, 179, thus changing the out-put rations of the transmissions, increasing the power transmitted through the transmission from the prime mover. The configuration assumed by the control rod levers 181, 185, control rods 174, 176 and transmission ratio selector devices 177, 179 corresponding to a maximum speed straight line forward motion setting is illustrated in FIG. 21.

To turn the vehicle while it is moving forward at less than maximum speed, for example to make a right hand turn, the vehicle operator grasps the control handle 149, and without removing it from one of the notches 161 in which it may be located at the time, turns it in a clockwise direction, thus pivoting it in a plane substantially parallel to the horizontal plane through the longitudinal axis of the vehicle. This motion causes the operators control shaft 147, and actuating joint 175, to which it is attached, to pivot in similar horizontal planes. As the actuating joint 175 pivots it causes the control rod levers 181, 185 to rotate through a horizontal plane. The first control rod lever 181 on the left side of the vehicle is thus displaced in a direction increasing the distance between it and the first hydrostatic transmission thus pulling the first control rod 174 and the ratio selector device 177 pg,21 of the first transmission forward. This causes the driving ratio of the first transmission to increase resulting in a transmission of more power to the drive system associated with the first transmission which increases the speed of the traction members on that side of the vehicle. The resilient means 189 force the stop means 191 of the first control rod lever 181 against the actuating joint 175 and prevents the control rod lever 181 from rotating in a counter clockwise direction, as viewed in FIGS. 1 and 2, preventing any lost motion in the first control rod lever 181. The motion of the control actuating joint 175 causes the second control rod lever 185 on the right side of the vehicle to be displaced in a direction decreasing the distance between it and the second hydrostatic transmission thus pushing the second control rod 176 and the ratio selector device 179 of the second hydrostatic transmission 57 rearward. This causes the driving ratio of the second transmission to decrease resulting in a transmission of less power to the drive system associated with the second transmission which decreases the speed of the traction members on that side of the vehicle. The stop means 193 of the second control rod lever 185 prevents movement of the second control rod lever 185 in a counter clockwise direction, as viewed in FIGS. 1 and 2, preventing any lost motion in the second control rod lever 185. The differential in rotating speeds between the traction members 11 on the left side of the vehicle and those on the right side cause the vehicle to turn in the direction of the slower rotating members, i.e. to the right in this example. The opposite occurs when a command for a left run is executed.

To turn the vehicle while it is moving forward at maximum speed, for example to make a right turn, the vehicle operator again turns the control handle in a clockwise direction without removing it from one of the notches in which it is located representing a maximum forward speed ratio, and the sequence of events describe supra for a right turn at a vehicle speed less than maximum is repeated with the exception that a lost motion is produced in the first control rod lever 181. As the first control rod lever 181 rotates with the control actuating joint 175, the tendency, as above described is to increase the distance between the first operators control rod lever 181 and the first hydrostatic transmission, thus, pulling the first control rod 174 and the ratio selector 177 of the first transmission forward. However, the transmission ratio selector device 177 is already in its most forward position corresponding to a maximum forward speed, it cannot be further displaced forward. If this condition prevailed it would prevent the control actuating joint 175 from pivoting, thus, precluding any steering control of the vehicle when the infinitely variable steering and transmission control where in a maximum speed straight line forward motion mode. However, the lost motion means 171 becomes actuated at this point. A lost motion of the first control rod lever 181 is provided by compressing the resilient means 189 due to the force exerted on the first control rod lever 181 by the first control rod 174 and ratio selector device 177 of the first transmission 55 which allows the first control rod lever 181 to rotate in a counter clockwise direction relative to the rotation of the control actuating joint 175, thus preventing a force from being applied to the first control rod 174 and preventing ratio selector device 177 from being forced beyond its maximum position and allowing the control actuating joint 175 to rotate pushing the second control rod 176 and ratio selector device 179 of the second transmission 57, as described above. The power transmitted to the chain drive system associated with the second transmission and the traction members 11 on the right side of the vehicle is decreased while the power transmitted to the chain drive system associated with the first transmission and the traction members 11 on the left side of the vehicle remains at the maximum, thus turning the vehicle to the right. The configuration assumed by the control rod levers 181, 185 control rods 174, 176, and transmission ratio selector devices 177, 179 corresponding to a right turn from a maximum straight line forward speed setting is illustrated in FIG. 22. The opposite occurs when a command for a left turn is executed.

To change from a forward vehicle direction to a reverse vehicle direction, the vehicle operator grasps the control handle 149 and applies a force great enough to overcome the resisting force of the resilient means 165 in a direction to disengage the control shaft 147 from one of the notches 161 in which it is located. Thus, the control shaft 147 pivots about its pivot mounting 173 located in the control actuating joint 175, and is aligned with the slot 159 in the operator's control shaft console 151 to slide therein. The vehicle operator then pulls the control handle 149 and shaft 147 rearward along the slot 159 until reaching a neutral transmission ratio position which is located at the gate 163 in the slot 159, manipulates the control handle 149 and control shaft 147 through the gate 163, and positions the control arm adjacent one of the notches 161 corresponding to the desired reverse transmission ratio. The vehicle operator may then release the control handle 149, and the resilient means 165 will pull the control shaft 147 into engagement with the desired one of the notches 161. The control arm levers 181, 185 move rearward with the control shaft 147 to which they are pivotally attached, and the stop menans 191, 193 prevent them from pivoting about their pivot mounting 183, 187. Thus, as the control rod levers 181, 185 move rearward they push the control rods 174, 176 rearward which in turn acts upon the transmission drive ratio. The vehicle may be also steered in the reverse direction by pivoting the control shaft in a generally horizontal plane without removing the control shaft 147 from one of the notches 161 in which it is located.

Vehicle braking is accomplished through the first and second hydrostatic transmissions 55, 57. To break the vehicle 1, the operator places the control shaft 147 in one of the notches 161 which corresponds to the neutral transmission drive ratio. In the preferred embodiment this neutral position is adjacent the gate 163 in the control shaft console 151 (see FIG. 20). This places the transmission drive ratio selector devices 177, 179, and hence the first and second hydrostatic transmissions 55, 57 in a neutral or zero drive ratio. Working fluid is thus prevented from circulating through the hydrostatic transmissions, and as a result hydraulic pressure is produced which prohibits the transmission output shafts 81 from rotating. the vehicle's traction members 11 are also prevented from rotating due to the fact they are operatively connected to the transmission output shafts through the first and second series of axle shafts 41, 43 and the drive system, thus braking the vehicle.

It should be kept in mind that the prime mover throttle control means need not be manipulated, or changed to maneuver the vehicle. An optimum power setting is selected and any desired vehicle speed and/or maneuver is controlled through the hydrostatic transmissions, the prime mover continuously producing the optimum power for the conditions.

The foregoing detailed description is given primarily for clearness of understanding and no unnecessary limitations should be understood therefrom.

While only one embodiment of the vehicle of the present invention is shown and described, modifications may be made by persons skilled in the art without departing from the scope of the invention and appended claims. For example, any number of prime movers such as Wankel, Otto cycle, Diesel cycle, Vapor power cycle engines or compound power plants incorporating a number of these cycles may be used. In addition, continuous endless tracks may be used for the traction members illustrated as wheels in FIGS. 1-3.

I claim:

1. An amphibious all-terrain vehicle, which comprises in combination:

a chassis having a floor pan, a front wall disposed at one end of said floor pan and situated transversely thereto, a rear wall disposed at the opposite end of said floor pan and disposed transversely thereto, two spaced apart side walls disposed along opposite longitudinal sides of said floor pan, said floor pan being structurally associated with said front wall, rear wall and side walls to form a unitized structure;

at least two spaced apart chassis side rails located interior to said chassis disposed along opposite longitudinal sides of and extending substantially the entire length of said chassis, each of said chassis side rails being structurally associated with said front wall, rear wall, one of said side walls and said floor pan and defining a hollow box beam;

a first and second series of drive axle shafts extending outwardly from opposite side walls and being rotatably mounted in said side walls and said chassis side rails;

a plurality of traction members operatively associated with a first and second series of drive axle shafts adapted to support said vehicle on, and to supply a resisting force to a surface upon which said vehicle rests to enable said vehicle to translate relative to said surface;

a power package including at least one prime mover ane at least a first and a second hydrostatic transmission operatively associated with said prime mover;

a power package mounting bracket to which said power package is mounted, said bracket being disposed between said front and rear walls and mounted in said chassis;

at least one transmission mounting means for each of said first and second hydrostatic transmissions connecting each of said transmissions to said chassis;

one end of each said transmission mounting means is associated with an output shaft portion of its respective transmission, and an opposite end of each said transmission mounting means is structurally associated with said chassis;

each of said output shaft portions of said transmissions are journaled in a bearing structure in said transmission mounting means constituting a trunnion mounting disposed concentrically with said transmission output shaft, thus allowing each of said transmissions to rotate about the longitudinal axis of its output shaft thereby isolating said transmissions from forces exerted on said chassis by said surfaces over which said vehicle translates;

a chain drive system operatively connecting an output shaft of said first hydrostatic transmission to said firs series of drive axle shafts, and an output shaft of said second hydrostatic transmission to said second series of drive axle shafts, a portion of said chain drive system being disposed in said hollow box beam;

a vehicle operator's control means;

an infinitely variable steering and transmission control means operatively connecting said first and second hydrostatic transmissions to said operator's control means to enable a vehicle operator to steer, to control the forward and reverse directions, and to control the speed of said vehicle by manipulating said vehicle operator's control means;

a prime mover throttle control means operatively associated with said prime mover to enable the vehicle operator to control the power output of said prime mover; and a vehicle body extending substantially the entire width and length of, and fixed to said chassis, said body having at least one passenger compartment.

2. An amphibious all-terrain vehicle as defined in claim 1, further characterized in that:

said hollow box beams are adapted to house a lubricating oil to lubricate said chain drive system;

said hollow box beams have a plurality of access openings, at least one of said openings being located adjacent to each axle shaft comprising said first and second series of drive axle shafts to provide access to said axle shafts; and a plurality of sealable cover plates each being adapted to close one of said plurality of access openings to prevent the egress of lubricating oil from said hollow box beam and ingress of contaminating material into said hollow box beam.

3. An amphibious all-terrain vehicle as defined in claim 1, further characterized in having:

resilient means disposed between said power package mounting bracket and said chassis to absorb forces generated in said chassis by said surface over which said vehicle translates to isolate said forces in said chassis.

4. An amphibious all-terrain vehicle as defined in claim 3, further characterized in that:

said axle shafts protrude through said side walls, and are journaled in first bearings structurally attached to said side walls;

sealing means are disposed at each of said first bearings to prevent the ingress of contaminates into said bearings; and said axle shafts extend through said box beam structure and have their ends journaled in second bearings attached to said chassis side rails at a position interior to said box beam.

5. An amphibious all-terrain vehicle as defined in claim 4, further characterized in having:

means defining a generally concave recess in said floor pan of said chassis relative to the exterior of said floor pan, said recess being disposed between said side walls of said chassis and extending longitudinally essentially the entire length of said floor pan.

6. An amphibious all-terrain vehicle as defined in claim 5, wherein said chain drive system comprises:

at least one first chain driving sprocket wheel operatively affixed to said output shaft of said first transmission to rotate with said output shaft;

at least one first chain driving sprocket wheel operatively affixed to said output shaft of said second transmission to rotate with said output shaft;

at least one idler sprocket assembly having at least first, second and third chain sprocket wheels rotatably mounted on a first axle shaft of said first series of axle shafts;

at least one idler sprocket assembly having at least first, second and third chain sprocket wheels rotatably mounted on a first axle shaft of said second series of axle shafts;

at least one first driving chain operatively interconnecting said first chain driving sprocket wheel mounted on said output shaft of said first transmission to said first chain sprocket wheel of said idler sprocket assembly mounted on said first axle shaft of said first series of axle shafts to transmit a torque from said first transmission to said idler sprocket assembly;

at least one first driving chain operatively interconnecting said first chain driving sprocket wheel mounted on said output shaft of said second transmission to said first chain sprocket wheel of said idler sprocket assembly mounted on said first axle shaft of said second series of axle shafts to transmit a torque from said second transmission to said idler sprocket assembly;

at least one second chain driven sprocket wheel operatively affixed to a second axle shaft of said first series of axle shafts;

at least one second chain driven sprocket wheel operatively affixed to a second axle shaft of said second series of axle shafts;

at least one second driving chain operatively interconnecting said second chain sprocket wheel of said idler sprocket assembly mounted on said first axle shaft of said first series of axle shafts to said second chain driven sprocket wheel affixed to said second axle shaft of siad first series of axle shafts to transmit said torque from said idler sprocket assembly to said second chain driven sprocket and hence to said axle shaft;

at least one second driving chain operatively interconnecting said second chain sprocket wheel of said idler sprocket assembly mounted on said first axle shaft of said second series of axle shafts to said second chain driven sprocket wheel affixed to said second axle shaft of said second series of axle shafts to transmit said torque from said idler sprocket assembly to said second chain driven sprocket and hence to said second axle shaft;

at least one third chain driven sprocket wheel operatively affixed to said second axle shaft of said first series of axle shafts to rotate with said second axle shaft;

at least one third chain driven sprocket wheel operatively affixed to said second axle shaft of said second series of axle shafts to rotate with said second axle shaft;

at least one fourth chain driven sprocket wheel operatively affixed to said first axle shaft of said first series of axle shafts;

at least one fourth chain driven sprocket wheel operatively affixed to said first axle shaft of said second series of axle shafts;

at least one third driving chain operatively interconnecting said third chain sprocket wheel affixed to said second axle shaft of said first series of axle shafts to said fourth chain driven sprocket wheel affixed to said first axle shaft of said first series of axle shafts to transmit said torque from said second axle shaft to said fourth chain driven sprocket wheel and hence to said first axle shaft, said first axle shaft therefore constituting a jackshaft;

at least one third driving chain operatively interconnecting said third chain sprocket wheel attached to said second axle shaft of said second series of axle shafts to said fourth chain driven sprocket wheel attached to said first axle shaft of said second series of axle shafts to transmit said torque from said second axle shaft to said fourth chain driven sprocket wheel and hence to said first axle shaft, said first axle shaft therefore constituting a jackshaft;

at least one fifth chain driven sprocket wheel operatively affixed to a third axle shaft of said first series of axle shafts;
at least one fifth chain driven sprocket wheel operatively affixed to a third axle shaft of said second series of axle shafts;
at least one fourth driving chain operatively interconnecting said third chain sprocket wheel of said idler sprocket assembly mounted on said first axle shaft of said first series of axle shafts to said fifth chain driven sprocket wheel affixed to said third axle of said first series of axle shafts to transmit said torque from said idler sprocket assembly to said fifth chain driven sprocket wheel and hence to said third axle shaft; and
at least one fourth driving chain operatively interconnecting said third chain sprocket wheel of said idler sprocket assembly mounted on said first axle shaft of said second series of axle shafts to said fifth chain driven sprocket wheel affixed to said third axle of said series of axle shafts to transmit said torque from said idler sprocket assembly to said fifth chain driven sprocket wheel and hence to said third axle shaft.

7. An amphibious all-terrain vehicle as defined in claim 6, wherein said chain driven system is further characterized in that:
said first chain driving sprocket wheels affixed to said first and second transmission output shafts are of a smaller circumference than said first chain sprocket wheels of said idler sprocket assemblies to which said first chain driving sprocket wheels are operatively interconnected, thus resulting in a greater torque being applied to said idler sprocket assemblies than to said first chain driving sprocket wheels;
said second chain driven sprocket wheels affixed to said second axle shafts are of a larger circumference than said second chain sprocket wheels of said idler sprocket assemblies to which said second chain driven sprocket wheels are operatively interconnected, thus resulting in a greater torque being applied to said second chain driven sprocket wheels and hence to said second axle shaft than to said idler sprocket assemblies; and
said fifth chain driven sprocket wheels affixed to said third axle shafts are of a larger circumference than said third chain sprocket wheels of said idler sprocket assemblies to which said fifth chain driven sprocket wheels are operatively interconnected, thus resulting in a greater torque being applied to said fifth chain driven sprocket wheels and hence to said third axle shafts than to said idler sprocket assemblies.

8. An amphibious all-terain vehicles as defined in claim 7, wherein said chain drive system is further characterized in that:
chain tensioning devices are disposed to operatively engage said first, second, third, and fourth driving chains to apply tensioning forces thereto to assure a constant engagement of said first second, third and fourth driving chains with said first chain sprocket wheels and said first chain sprocket wheels of said idler sprocket assemblies, said second chain sprocket wheels of said idler sprocket assemblies and said second chain driven sprocket wheels, said third chain driven sprocket wheels and said fourth chain driven sprocket wheels, and said third chain sprocket wheels of said idler sprocket assemblies and said fifth chain driven sprocket wheels respectively.

9. An amphibious all terrain vehicle as defined in calim 8, wherein said chain tensioning devices comrprise in combination:
a tensioning device mounting plate adapted to be secured to a structure;
at least one elongated ratchet plate pivotally mounted at one of its ends to one end of said mounting plate;
a plurality of ratchet teeth formed in an end of said ratchet plate opposite said end pivotally mounted to said mounting plate;
a sprocket wheel adapted to operatively engage one of said chains to be tensioned rotatably mounted at said end of said ratchet plate contaning said ratchet teeth, and being disposed such that its sprocket teeth extend beyond the longitudinal edges of said elongated ratchet plate;
first resilient means operatively associated with said ratchet plate biased to urge said ratchet plate to pivot about its pivot mounting in a direction generally toward said chain to be tensioned thereby causing said sprocket wheel to contact and apply a constant force against said chains to be tensioned thus keeping it in tension;
a pawl adapted to engage said ratchet teeth pivotally mounted at one end to an end of said mounting plate opposite said end to which said ratchet plate is pivotally mounted, said pawl being disposed to prevent movement of said ratchet plate in a direction generally away from said chains to be tensioned; and
second resilient means operatively associated with said pawl biased to urge said pawl to pivot about its pivot mounting in a direction toward said ratchet teeth to assure the engagement of said pawl with said ratchet teeth thereby holding said sprocket wheel in engagement with said chain to be tensioned against forces exerted by said chain on said sprocket wheel which would tend to cause said ratchet plate to pivot about its mounting in a direction generally away from said chain thus decreasing the force exerted on said chain by said ratchet wheel.

10. An amphibious all-terrain vehicle as defined in claim 9, wherein said infinitely variable steering and transmission control means comprises in combination:
a control actuating joint pivotally mounted to said vehicle for motion in two planes generally perpendicular to each other one of said planes being substantially parallel to said vertical plane along a longitudinal axis of said vehicle;
a first control rod lever pivotally mounted at one of its ends to a side of said control actuating joint;
a second control rod lever pivotally mounted at one of its ends to a side of said control actuating joint opposite said side thereof to which said first control rod lever is mounted;
resilient means connected to said first control rod lever being biased to produce a force which tends to resist movement of said first control rod lever in one direction about its pivot mounting;
resilient means connected to said second control rod lever being biased to produce a force which tends to resist movement of said second control rod lever in one direction about its pivot mounting;

when a force exerted on said first and second control rod levers exceeds said resisting forces produced by said resilient means, said resilient means are no longer capable of resisting said movement of said control rod levers about their pivot mountings thus allowing said control rod levers to move about their respective pivot mountings, the location of a point at which said force is exerted on said control rod levers remaining substantially static;

stop means which limit the rotation of said first and second control rod levers about their respective mounting points in a direction opposite said direction in which said resilient means resist motion of said first and second control rod levers;

a first control rod pivotally mounted at one of its ends to an end of said first control lever opposite said end of said first control rod lever which is pivotally mounted to said control actuating joint and pivotally mounted at its opposite end to a ratio selector device of said first transmission; and a second control rod pivotally mounted at one of its ends to an end of said second control lever opposite said end of said second lever which is pivotally mounted to said control actuating joint and pivotally mounted at its opposite end to a ratio selector device of said second transmission.

11. An amphibious all terrain vehicle as defined in claim 10, further characterized in that said vehciel operator's control means includes:

a vehicle operator's control shaft mounted in said control actuating joint adapted for motion, relative to said control actuating joint, through a vertical plane substantially transverse to a longitudinal centerline of said vehicle;

an operator's control shaft console;

means defining an elongated slot in said platfrom adapted to slidably receive said operator's control arm;

means defining a plurality of notches spaced apart along a longitudinal edge of said elongated slot adapted to receive said operator's control arm, each of said notches corresponding to a particular transmission ratio;

means defining a gate located between a series of said notches corresponding to a forward motion transmission ratios and rearward motion transmission ratios to prevent a vehicle operator from inadvertently placing said operator's control arm in an undesired notch; and resilient means associated with said operator's control arm adapted to bias said operator's control arm toward the longitudinal edge of said slot containing said spaced apart notches in said operator's control shaft platform.

* * * * *

UNITED STATES PATENT OFFICE
CERTIFICATE OF CORRECTION

Patent No. 3,771,615     Dated Nov. 13, 1973

Inventor(s) Anthony Rieli

It is certified that error appears in the above-identified patent and that said Letters Patent are hereby corrected as shown below:

Column 1, line 46, change "logintudinal" to --longitudinal--.
       Column 2, line 67, change "adjacnet" to --adjacent--.
       Column 5, line 53, change "Preferrably" to --Preferably--.
       Column 6, line 32, change "of" to --or--.
       Column 7, line 8, change "spalsh" to --splash--.
               line 36, change "driection" to --direction-
       Column 8, line 7, change "13" to --12--.
               line 23, change "cuased" to --caused--.
       Column 10, line 18, change "reilient" to --resilient--.
               line 25, delete "angles" and insert --angled--;
               line 51, change "throttel" to --throttle--
       Column 11, line 5, change "undeisred" to --undesired--.
               line 44, after "177" delete "pg,21".
       Column 13, line 37, delete "the" and insert --The--.
               line 26, delete "ane" and insert --and--.
               line 50, delete "surfaces" and insert --surfaces--.
               line 53, delete "firs" and insert --first-
       Column 16, line 23, change "siad" to --said--.
               line 26, following "said" insert --second--.
       Column 17, line 21, following "said" insert --second--.
               line 26, change "driven" to --drive--.
       Column 18, line 6, change "calim" to --claim--.
       Column 20, line 1, "vehciel" should read -- vehicle -- .

Signed and sealed this 20th day of August 1974.

(SEAL)
Attest:

McCOY M. GIBSON, JR.      C. MARSHALL DANN
Attesting Officer           Commissioner of Patents